United States Patent
Chou et al.

(10) Patent No.: US 10,230,957 B2
(45) Date of Patent: Mar. 12, 2019

(54) SYSTEMS AND METHODS FOR ENCODING 360 VIDEO

(71) Applicant: CyberLink Corp., Shindian, Taipei (TW)

(72) Inventors: Chen-Wei Chou, New Taipei (TW); Tai-San Wang, New Taipei (TW)

(73) Assignee: CYBERLINK CORP., Shindian, Taipei (TW)

( * ) Notice: Subject to any disclaimer, the term of this patent is extended or adjusted under 35 U.S.C. 154(b) by 51 days.

(21) Appl. No.: 15/464,590

(22) Filed: Mar. 21, 2017

(65) Prior Publication Data

US 2017/0280141 A1   Sep. 28, 2017

Related U.S. Application Data

(60) Provisional application No. 62/311,510, filed on Mar. 22, 2016.

(51) Int. Cl.
*H04N 19/147* (2014.01)
*H04N 19/597* (2014.01)
*H04N 19/115* (2014.01)
*H04N 19/174* (2014.01)

(52) U.S. Cl.
CPC ......... *H04N 19/147* (2014.11); *H04N 19/115* (2014.11); *H04N 19/174* (2014.11); *H04N 19/597* (2014.11)

(58) Field of Classification Search
CPC ............................ H04N 19/147; H04N 19/115
See application file for complete search history.

(56) References Cited

U.S. PATENT DOCUMENTS

| | | |
|---|---|---|
| 6,434,265 B1 | 8/2002 | Xiong et al. |
| 6,518,965 B2 | 2/2003 | Dye et al. |
| 7,894,531 B1 | 2/2011 | Cetin et al. |
| 8,130,257 B2 | 3/2012 | Cutler |
| 8,217,988 B2 | 7/2012 | Park |
| 8,355,041 B2 | 1/2013 | Chen et al. |
| 8,907,968 B2 | 12/2014 | Tanaka et al. |
| 9,041,773 B2 | 5/2015 | Chen et al. |
| 2005/0226323 A1* | 10/2005 | Secker ............... H04N 19/593 375/240.11 |
| 2011/0235706 A1 | 9/2011 | Demircin et al. |

(Continued)

OTHER PUBLICATIONS

Kolor Eyes, http://www.softpedia.com/get/Multimedia/Video/Video-Players/Kolor-Eyes.shtml. Mar. 6, 2014.

(Continued)

*Primary Examiner* — William C Vaughn, Jr.
*Assistant Examiner* — Jerry T Jean Baptiste
(74) *Attorney, Agent, or Firm* — McClure, Qualey & Rodack, LLP

(57) ABSTRACT

A computing device for re-encoding 360 video based on adjusted bitrate allocation receives and decodes a 360 video. The computing device partitions the 360 video into a plurality of regions and determines a pixel number for each of the plurality of regions. The computing device also determines a distortion level for each of the plurality of regions and performs bitrate allocation for each of the regions based on one or more of: the corresponding pixel number and the corresponding distortion level.

14 Claims, 14 Drawing Sheets

(56) References Cited

U.S. PATENT DOCUMENTS

2012/0257076 A1* 10/2012 Satou ................. H04N 5/23229
348/222.1
2017/0094279 A1* 3/2017 Piramanayagam .. H04N 19/136
2017/0230668 A1* 8/2017 Lin ...................... H04N 19/563

OTHER PUBLICATIONS

Render Settings, http://www.andrewhazelden.com/projects/playblastvr/docs/render_settings.html (Printed on Mar. 16, 2017).
The 360 video stitching workflow with VideoStitch using PTGui and calibration tool, http://freedom360.us/tutorials/software/videostitch-tutorial/ (Printed on Mar. 16, 2017).
360 Video Fundamentals, https://thefulldomeblog.com/2014/03/06/360-video-fundamentals/ Mar. 6, 2014.

* cited by examiner

FISHEYE LENS

EQUIRECTANGULAR LENS

SYSTEMS AND METHODS FOR ENCODING 360 VIDEO

CROSS-REFERENCE TO RELATED APPLICATION

This application claims priority to, and the benefit of, U.S. Provisional Patent Application entitled, "Systems and Methods for Encoding 360 Video," having Ser. No. 62/311,510, filed on Mar. 22, 2016, which is incorporated by reference in its entirety.

TECHNICAL FIELD

The present disclosure generally relates to video processing and more particularly, to systems and methods for encoding 360 video.

BACKGROUND

As smartphones and other mobile devices have become ubiquitous, people have the ability to capture video virtually anytime. Furthermore, 360 videos have gained increasing popularity. One common complaint with 360 videos is that the resolution tends to be low due in part to the high storage requirements that higher resolution content would otherwise require.

SUMMARY

A computing device for re-encoding 360 video based on adjusted bitrate allocation receives and decodes a 360 video. The computing device partitions the 360 video into a plurality of regions and determines a pixel number for each of the plurality of regions. The computing device also determines a distortion level for each of the plurality of regions and performs bitrate allocation for each of the regions based on one or more of: the corresponding pixel number and the corresponding distortion level.

Another embodiment is a system that comprises a memory storing instructions and a processor coupled to the memory. The processor is configured by the instructions to receive and decoding a 360 video, partition the 360 video into a plurality of regions, and determine a pixel number for each of the plurality of regions. The processor is further configured by the instructions to determine a distortion level for each of the plurality of regions; and perform bitrate allocation for each of the regions based on one or more of: the corresponding pixel number and the corresponding distortion level.

Another embodiment is a non-transitory computer-readable storage medium storing instructions to be implemented by a computing device having a processor. The instructions, when executed by the processor, cause the computing device to receive and decoding a 360 video, partition the 360 video into a plurality of regions, and determine a pixel number for each of the plurality of regions. The instructions, when executed by the processor, further cause the computing device to determine a distortion level for each of the plurality of regions and perform bitrate allocation for each of the regions based on one or more of: the corresponding pixel number and the corresponding distortion level.

BRIEF DESCRIPTION OF THE DRAWINGS

Various aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

An increasing number of digital capture devices are equipped with the ability to record virtual reality or 360 degree video (hereinafter "360 video"), which offers viewers a fully immersive experience. The creation of 360 video generally involves capturing a full 360 degree view using multiple cameras, stitching the captured views together, and encoding the video. One common complaint with 360 videos is that the resolution tends to be low due in part to the high storage requirements that higher resolution content would otherwise require. Various embodiments are disclosed for systems and methods for an improved encoding algorithm for 360 video whereby better quality is achieved without changes to the resolution, bitrate, and video codec.

Figure 1:
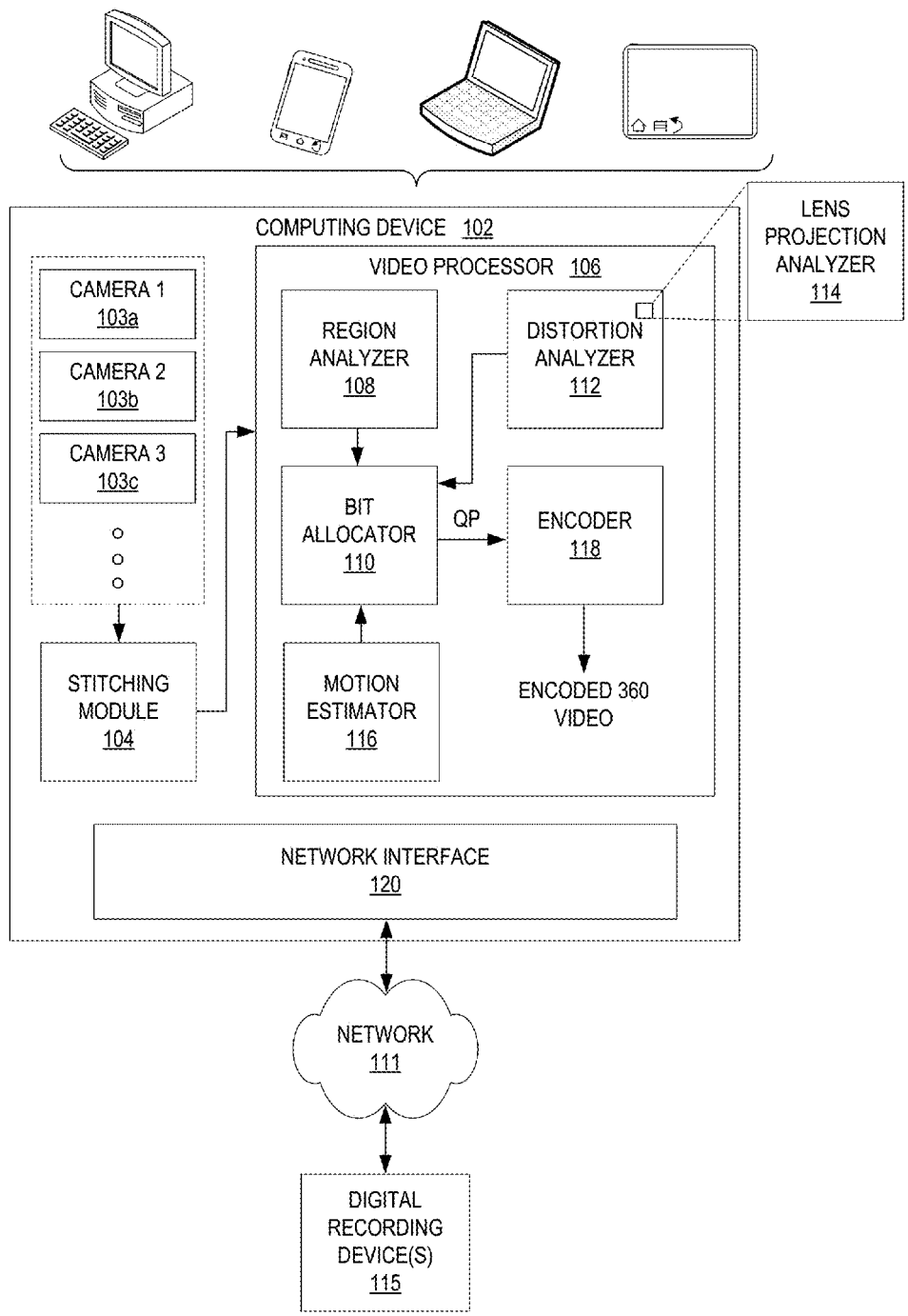
FIG. 1 is a block diagram of a computing device in which the bitrate allocation may be implemented in accordance with various embodiments.

A description of a system for implementing an encoding algorithm is now described followed by a discussion of the operation of the components within the system. FIG. 1 is a block diagram of a computing device 102 in which the encoding algorithm disclosed herein may be implemented. The computing device 102 may be embodied as a computing device 102 equipped with digital content recording capabilities, where the computing device 102 may include, but is not limited to, a digital camera, a smartphone, a tablet computing device 102, a digital video recorder, a laptop computer coupled to a webcam, and so on. For some embodiments, the computing device 102 may be equipped with a plurality of cameras 103a, 103b, 103c where the cameras 103a, 103b, 103c are utilized to capture digital media content comprising 360 degree views. In accordance with such embodiments, the computing device 102 further comprises a stitching module 104 configured to process the 360 degree views. Alternatively, a network interface 120 in the computing device 102 may utilized to allow the computing device 102 to obtain 360 video from other digital recording devices 115 over a network 111.

As one of ordinary skill will appreciate, the digital media content may be encoded in any of a number of formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), or any number of other digital formats.

Figure 4:
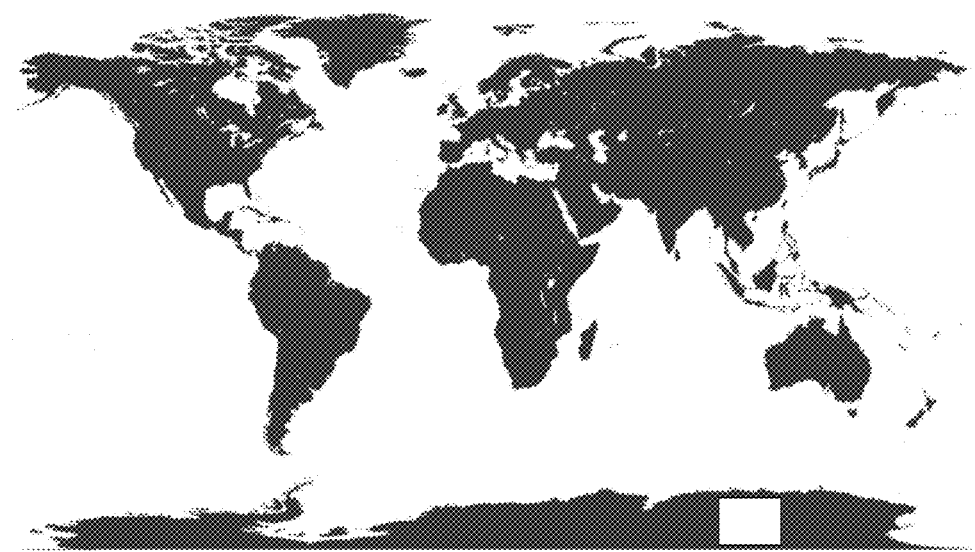
FIG. 4 illustrates a region within a two-dimensional (2D) view of the 360 video.

A video processor 106 executes on a processor of the computing device 102 and configures the processor to perform various operations relating to the coding of 360 video. The video processor 106 includes a region analyzer 108 configured to determine the size of each region depicted in the 360 view, where the region size is measured according to the number of pixels. To illustrate, reference is made to the two-dimensional (2D) view depicted in FIG. 4. When the view is projected onto a spherical view, the region analyzer 108 will determine that the highlighted region towards the bottom will comprise a smaller region than a region in the middle of the sphere (e.g., near the equator).

The video processor 106 further comprises a bit allocator 110 configured to determine the bit allocation for each region during the encoding process based on the corresponding region size. The distortion analyzer 112 is configured to determine the amount of distortion that occurs during the processing of 2D videos into a 360 video. The distortion analyzer 112 includes a lens projection analyzer 114 configured to determine the lens projection used for capturing the 2D videos. The lens projection type may comprise, for example, equirectangular, cylindrical, rectilinear, fisheye, mercator, sinusoidal, stereographic, and so on.

The bit allocator 110 discussed above may be further configured to determine bit allocation based on the degree of distortion. The encoder 118 encodes the received media content based on the revised bit allocation and outputs a compressed 360 video. The received media content may comprise, for example, 360 video, 360 degree image, "non-360" content having 360 effects (e.g., a 360 title, 360 animation) and so on. The motion estimator 116 identifies regions with relatively higher degrees of motion by objects where the motion vectors of neighboring regions are analyzed. Note that in the 2D plane, the neighboring regions do not necessarily comprise regions adjacent to a target region. Rather, for exemplary embodiments, neighboring regions are identified for purposes of motion estimation based on the projected spherical view. The bit allocator 110 may be further configured to determine bitrate allocation based on the degree of motion associated with the region.

Figure 2:
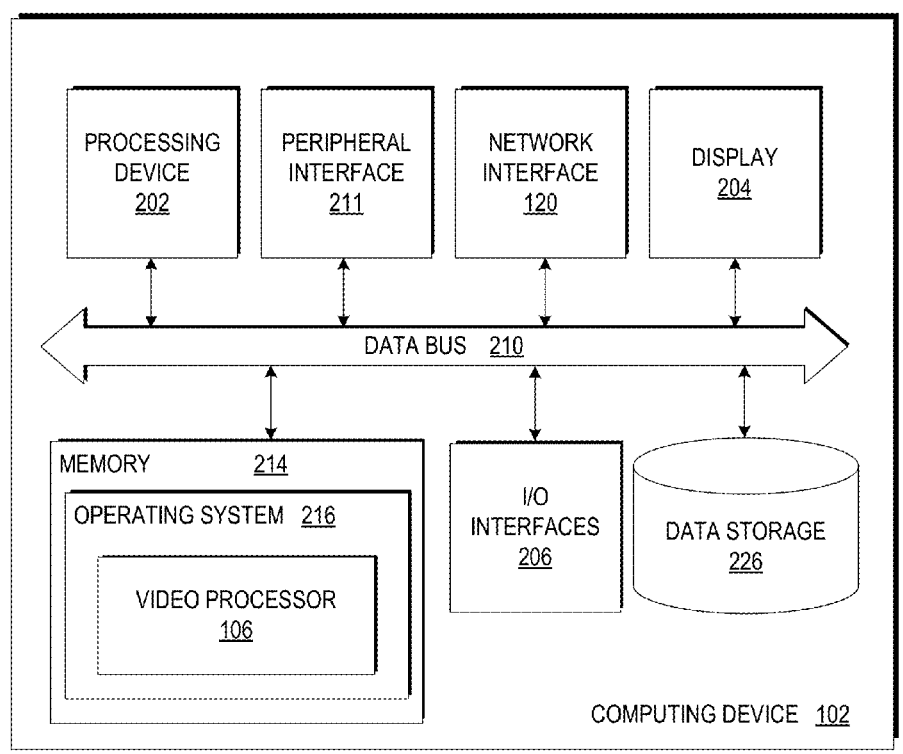
FIG. 2 illustrates a schematic block diagram of the computing device in FIG. 1 in accordance with various embodiments.

FIG. 2 illustrates a schematic block diagram of the computing device 102 in FIG. 1. The computing device 102 may be embodied in any one of a wide variety of wired and/or wireless computing devices 102, such as a desktop computer, portable computer, dedicated server computer, multiprocessor computing device 102, smart phone, tablet, and so forth. As shown in FIG. 2, each of the computing device 102 comprises memory 214, a processing device 202, a number of input/output interfaces 206, a network interface 120, a display 204, a peripheral interface 211, and mass storage 226, wherein each of these components are connected across a local data bus 210.

The processing device 202 may include any custom made or commercially available processor, a central processing unit (CPU) or an auxiliary processor among several processors associated with the computing device 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components of the computing device 102 depicted in FIG. 1. In accordance with such embodiments, the components are stored in memory 214 and executed by the processing device 202. One of ordinary skill in the art will appreciate that the memory 214 can, and typically will, comprise other components which have been omitted for purposes of brevity.

Input/output interfaces 206 provide any number of interfaces for the input and output of data. For example, where the computing device 102 comprises a personal computer, these components may interface with one or more user input/output interfaces 206, which may comprise a keyboard or a mouse, as shown in FIG. 2. The display 204 may comprise a computer monitor, a plasma screen for a PC, a liquid crystal display (LCD) on a hand held device, a touchscreen, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 3:
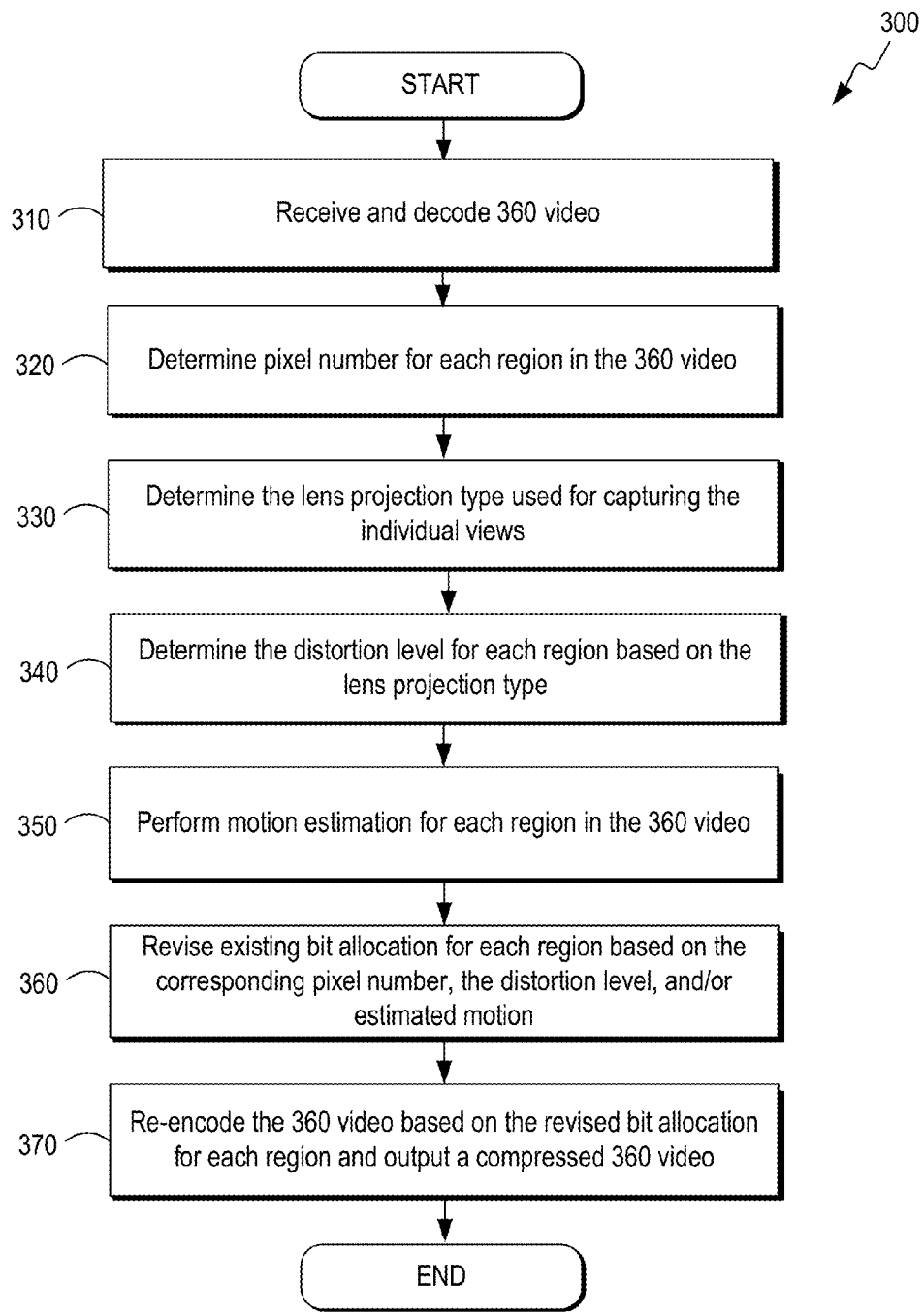
FIG. 3 is a flowchart for performing bitrate allocation utilizing the computing device of FIG. 1 in accordance with various embodiments.

Reference is made to FIG. 3, which is a flowchart 300 in accordance with an embodiment for encoding 360 video performed by the computing device 102 of FIG. 1. It is understood that the flowchart 300 of FIG. 3 provides merely an example of the different types of functional arrangements that may be employed to implement the operation of the various components of the computing device 102. As an alternative, the flowchart 300 of FIG. 3 may be viewed as depicting an example of steps of a method implemented in the computing device 102 according to one or more embodiments.

Although the flowchart 300 of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. It is understood that all such variations are within the scope of the present disclosure.

To begin, in block 310, the computing device 102 receives and decodes 360 video to be re-encoded. The computing device 102 partitions the 360 video into regions of predetermined pixel sizes and analyzes each region. In block 320, the computing device 102 determines the pixel number to be allocated for each region of the 360 video for encoding purposes where based on the location of each region within the 360 video, the computing device 102 determines whether a particular region will be prominently displayed. Specifically, if the projection type is equirectangular, regions towards the viewing boundary of the panoramic view will be allocated fewer bits whereas regions that fall within the central region of the panoramic view will be allocated a higher number of bits.

In block 330, the computing device 102 determines the lens projection type used for generating the 360 video received by the computing device 102. The lens projection type will result in different types of distortion in the 360 video as shown, for example, in FIG. 7. The lens projection type may comprise, for example, equirectangular, cylindrical, rectilinear, fisheye, mercator, sinusoidal, stereographic, and so on.

In block 340, the computing device 102 determines the distortion level for each region based on the lens projection type. For some embodiments, the distortion level is determined by superimposing a square onto each region in the 360 video. Based on the amount of warping relative to the square, a distortion level value is assigned to each region. Bitrate allocation is then performed in a manner similar to the bitrate allocation described above. However, rather than assigning the bit rate based on whether regions are prominently display, the bit rate is assigned based on the distortion level for each region. For example, regions that exhibit higher distortion will be allocated a bitrate that is higher than the average frame rate (e.g., 3 Mbps), whereas regions in the 360 video that exhibit less distortion are allocated a bitrate that is lower than the average frame rate.

In block 350, the computing device 102 performs motion estimation for each region in the 360 video. In block 360, the existing bit allocation is revised for each region based on the corresponding pixel number, the distortion level, and/or the estimated motion. Bitrate allocation is then performed in a manner similar to the bitrate allocation described above. However, rather than assigning the bit rate based on whether regions are prominently display, the bit rate is assigned based on the estimated motion for each region. Specifically, regions with higher estimated motion are assigned a higher bitrate, and regions with lower estimated motion are assigned a lower bitrate. In this regard, the existing bit allocation may be modified for each region based on the corresponding pixel number, the distortion level, the estimated motion, or any combination thereof. In block 370, the 360 video is re-encoded according to the revised bit allocation for each region. Thereafter, the process in FIG. 3 ends.

Figure 5:
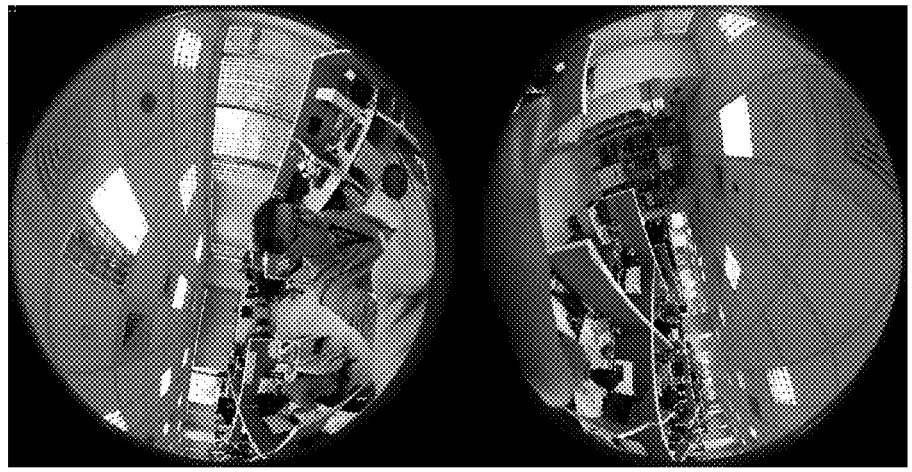
FIG. 5 illustrates examples of lens projection types.
Figure 5:

Additional details are now provided for various steps in the flowchart of FIG. 3. FIG. 5 illustrates examples of lens projection types. As discussed above in connection with block 330 in the flowchart of FIG. 3, the computing device 102 (FIG. 1) determines the lens projection type used for generating the 360 video as the lens projection type will result in different types of distortion in the 360 video. The lens projection type may comprise, for example, equirectangular, cylindrical, rectilinear, fisheye, mercator, sinusoidal, stereographic, and so on.

Figure 6:
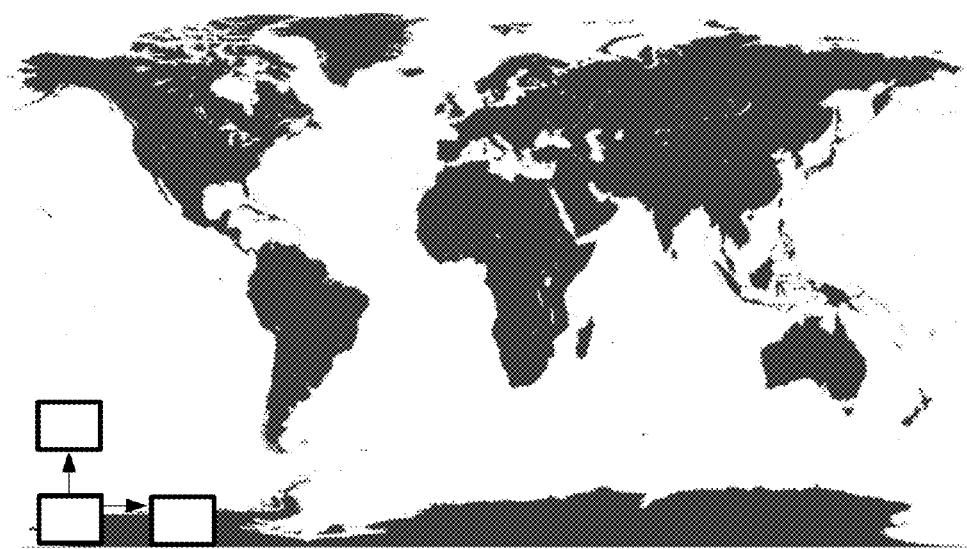
FIG. 6 illustrates location of neighboring regions within a 2D view of the 360 video.

Reference is made to FIG. 6, which illustrates the locations of neighboring regions within a 2D view of the 360 video. As discussed above in connection with block 350, the computing device 102 performs motion estimation for each region in the 360 video, where pixel allocation for each region may be performed based on the estimated motion. Specifically, the motion estimator 116 (FIG. 1) identifies regions with a relatively higher degree of motion by objects where the motion vectors of neighboring regions are analyzed.

Figure 7:
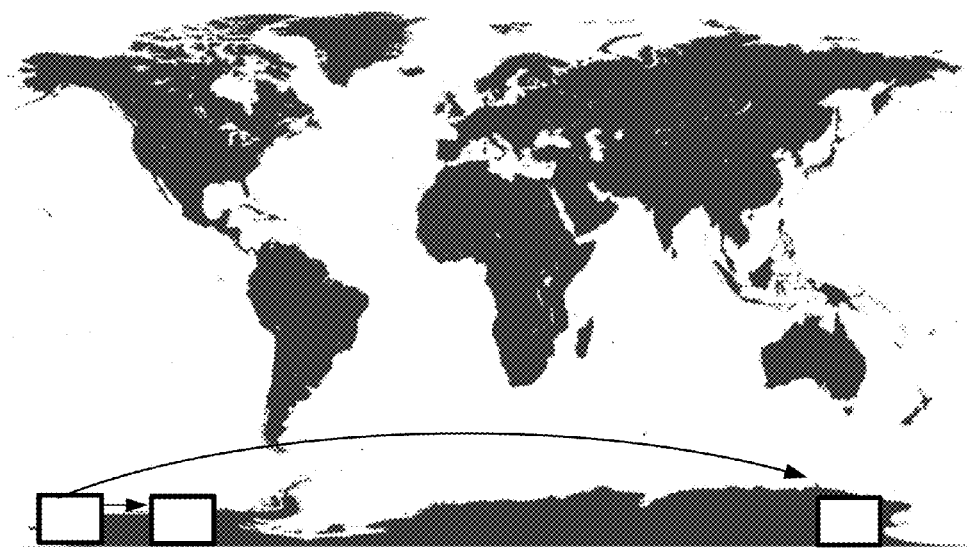
FIG. 7 illustrates location of neighboring regions within the 360 video in accordance with various embodiments.

For exemplary embodiments, neighboring regions are identified for purposes of motion estimation based on the projected spherical view. With conventional techniques for motion estimation, the motion vectors of neighboring regions in the 2D views as shown in FIG. 6 are analyzed. However, in accordance with various embodiments, the neighboring regions analyzed for motion estimation are those regions that are adjacent to the target region when projected in the spherical view, as shown in FIG. 7. In the spherical view shown in FIG. 7, the regions designated by the arrows are adjacent to the target region. The motion vectors from these neighboring regions are utilized for motion estimation.

Figure 8:
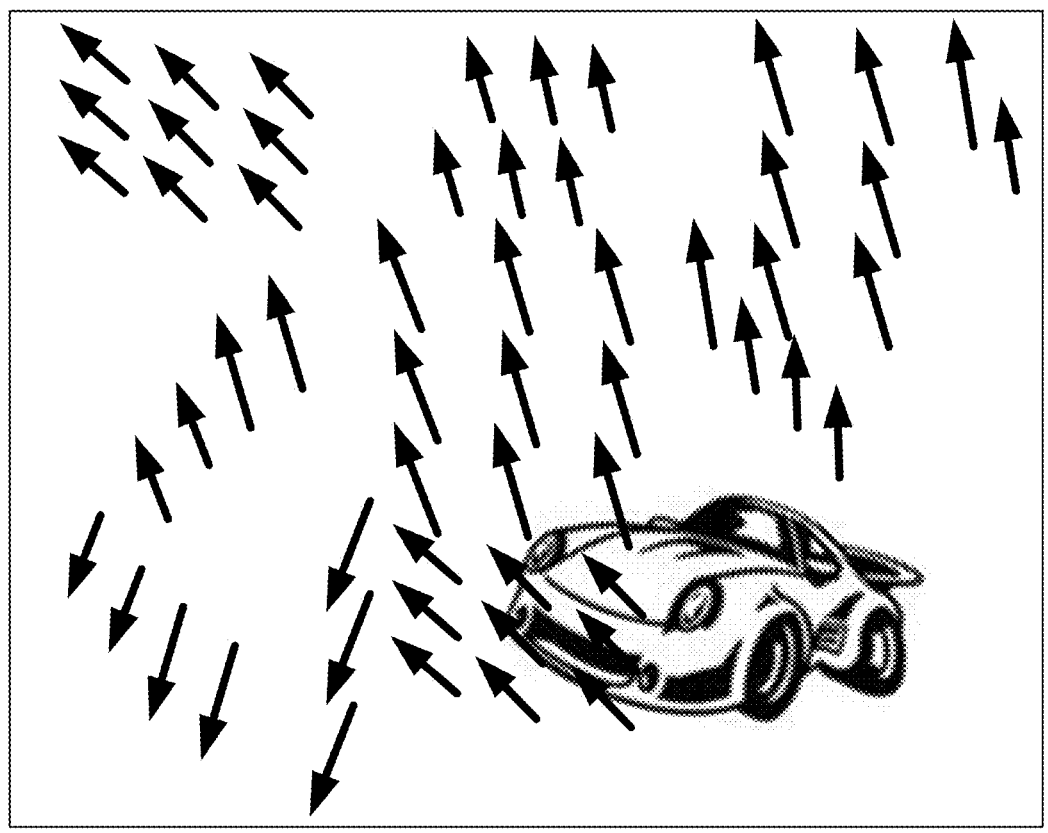
FIG. 8 illustrates motion vectors in the 360 video in accordance with various embodiments.
Figure 9A:
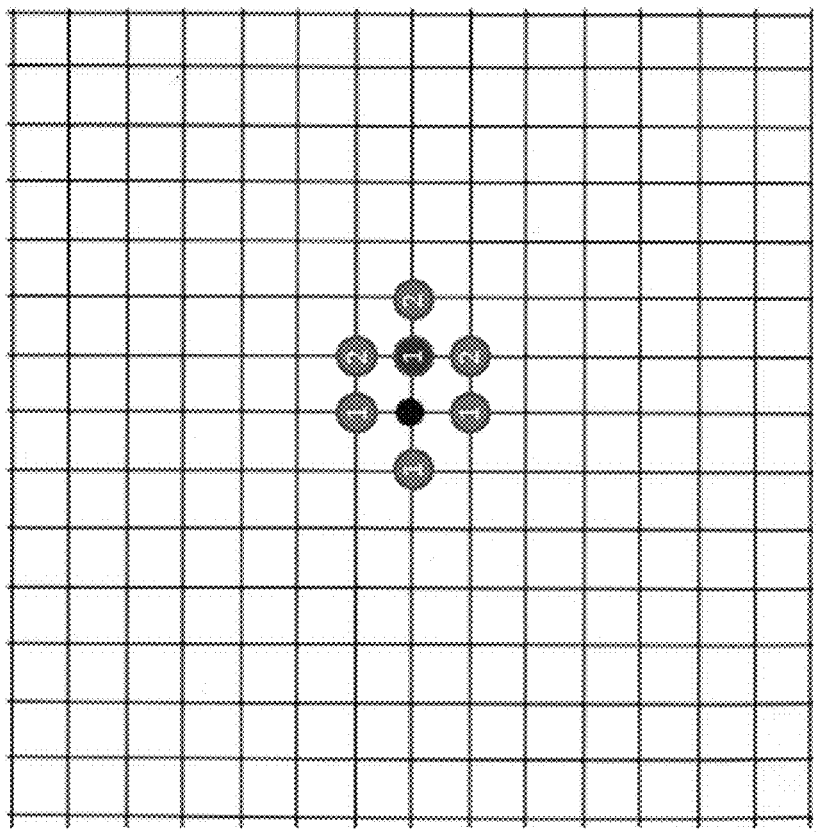
FIGS. 9A-9D illustrate various algorithms for identifying neighboring regions for purposes of motion estimation in accordance with various embodiments.
Figure 9B:
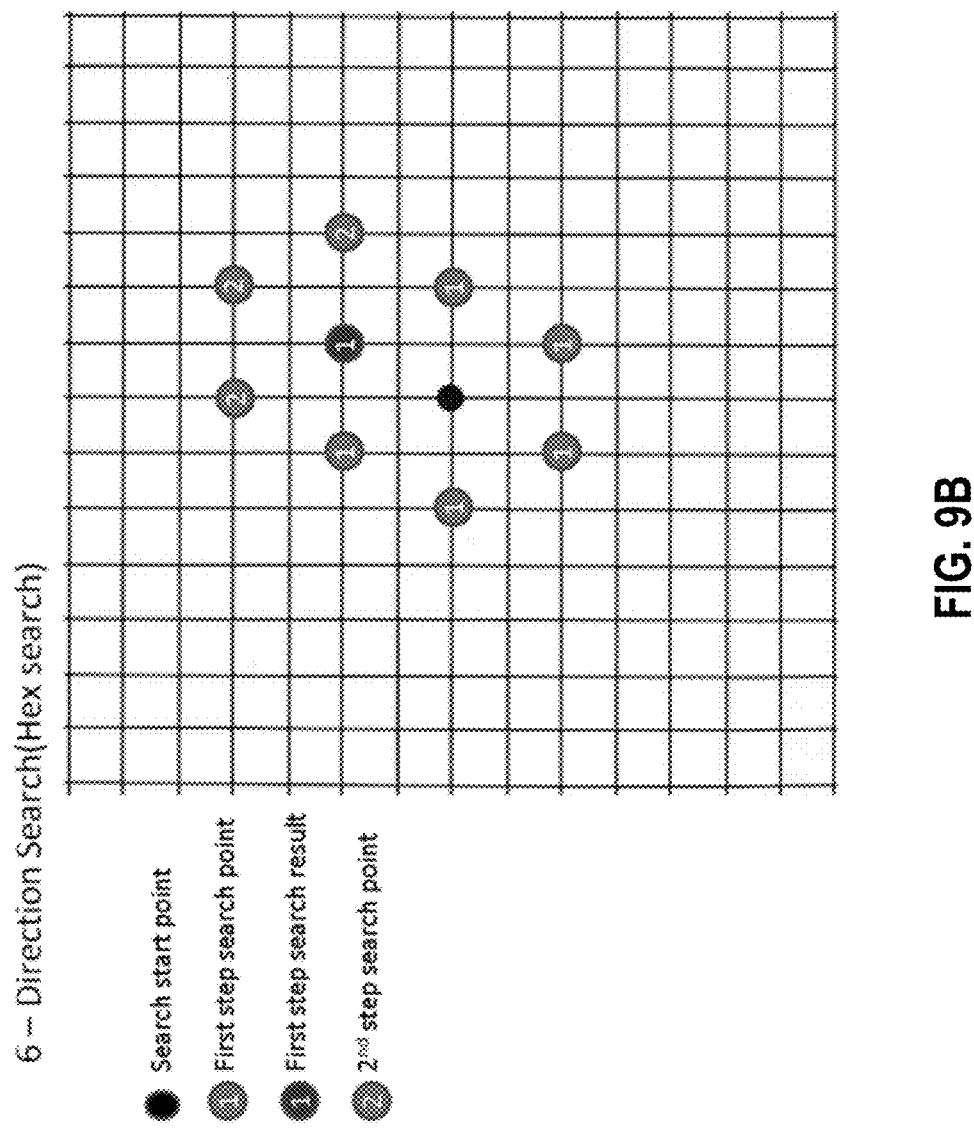
Figure 9C:
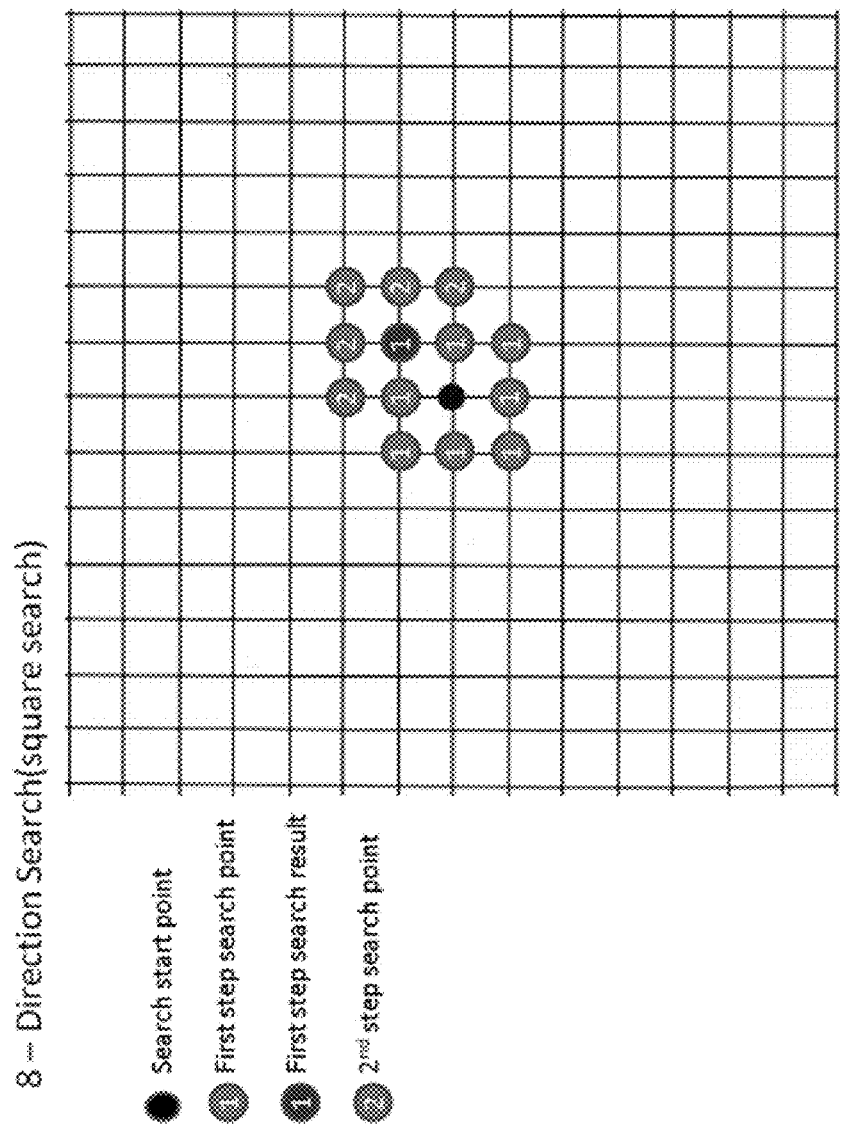
Figure 9D:
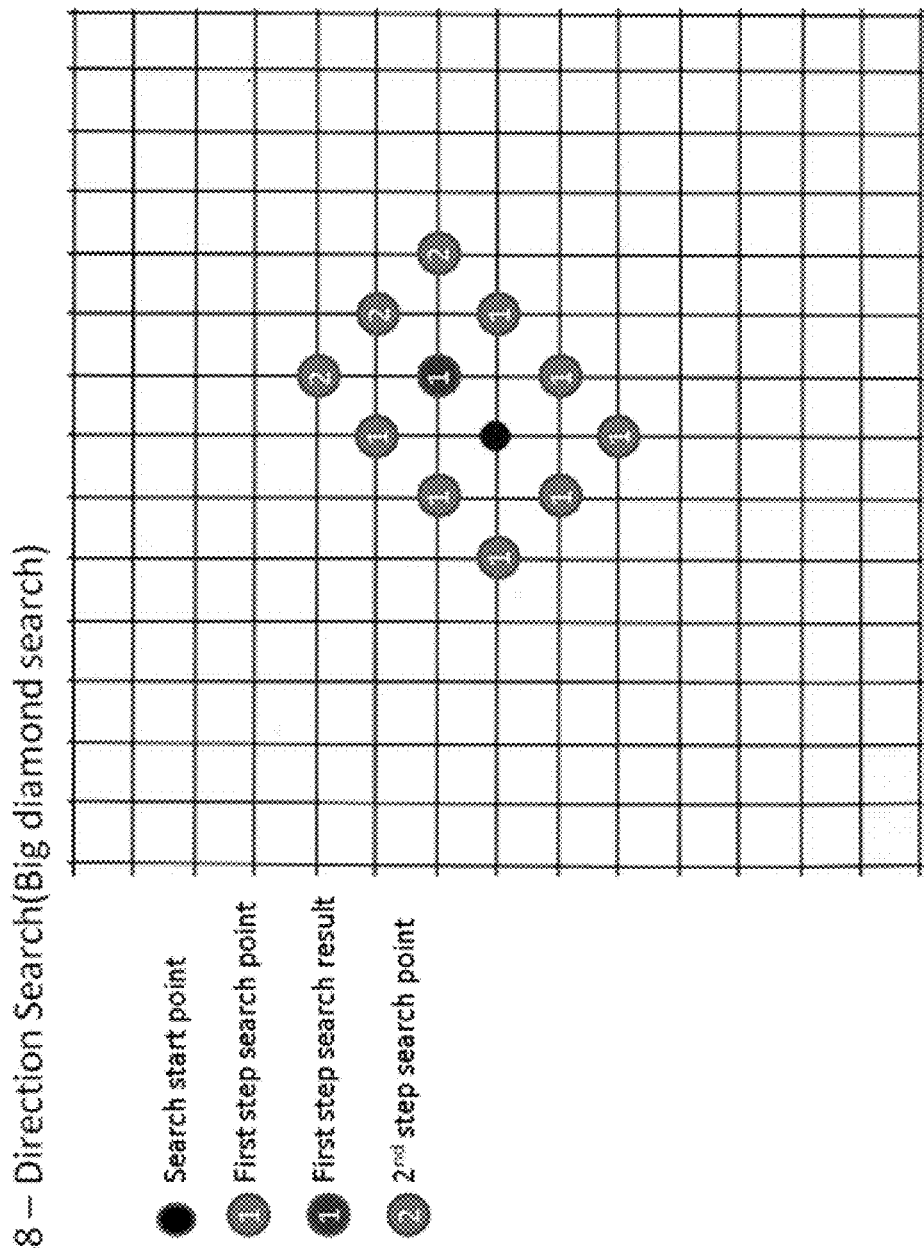

FIG. 8 illustrates motion vectors in the 360 video in accordance with various embodiments. As discussed above, in the 2D plane, the neighboring regions do not necessarily comprise regions adjacent to a target region. Rather, neighboring regions for purposes of motion estimation are identified based on the projected spherical view. In accordance with various embodiments, the neighboring regions are regions adjacent to the target region after being projected onto the spherical view. In the spherical view, the regions designated by the arrows are adjacent to the target region and thus, the motion vectors from these neighboring regions are utilized for motion estimation.

FIGS. 9A-9D illustrate various techniques for identifying neighboring blocks, where different search pattern are implemented. Suppose for purposes of illustration that the second frame is the source frame. Motion search is then performed for a given block. The first frame is the reference frame (which is typically the frame prior to the second frame). The corresponding block on the first frame which is most similar to the block is then identified. One possible way for identifying the most similar block is to compare every block in the first frame and then find the most similar one. However, this requires time. Another way is using the same coordination of the block in the first frame as the starting point and then searching the neighboring block. If the neighboring block in one direction has a higher degree of similarity than the starting point, the system moves to that block and then compares the neighboring blocks. These steps are repeated until the degree of similarity of all neighboring blocks is lower than that of the middle block. That block is the final corresponding block for the block.

Figure 10A:
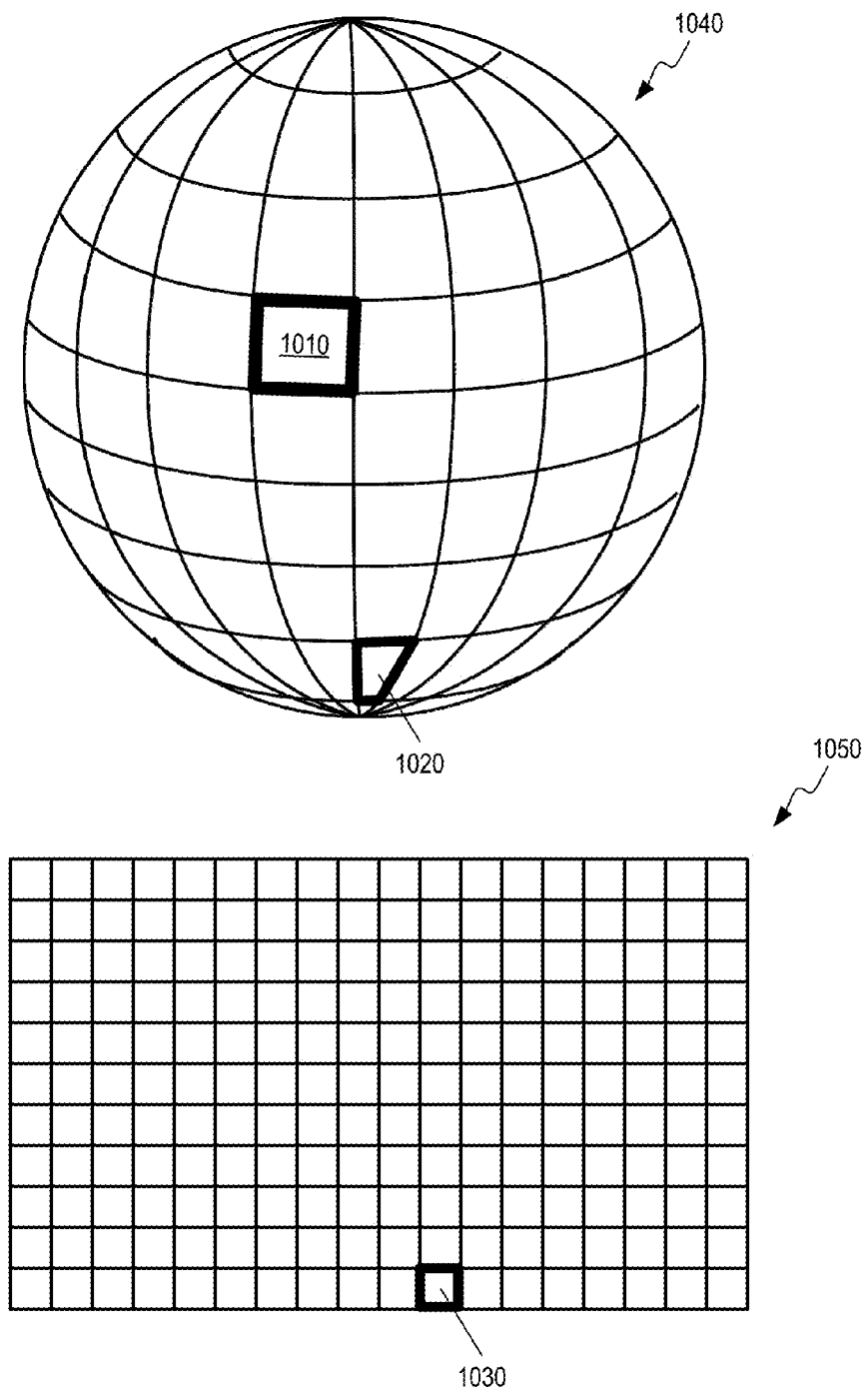
FIGS. 10A-10B illustrate allocation of the pixel number based on the projection type in accordance with various embodiments.

Additional details are now provided regarding how pixel numbers are assigned to individual regions (block 320 in FIG. 3). Reference is made to FIG. 10A, which shows a 360 degree spherical surface area 1040 having a longitudinal dimension and a latitude dimension. As discussed earlier, when the view is projected onto a spherical view, the region analyzer 108 (FIG. 1) will determine that the highlighted region towards the bottom will comprise a smaller region than a region in the middle of the sphere (e.g., near the equator). In some embodiments, the pixel number is determined based on the corresponding region size on the 360 degree spherical surface area 1040. For example, for a (16×16) pixel block 1030 on the 2D frame 1050, the original pixel bit allocation weight is 256 pixels. When projected onto the 360 degree spherical surface area 1040, a pixel block 1010 of the same size lying along the equator will be assigned a similar pixel count (256 pixels). However, a pixel block 1020 located along the bottom of the spherical surface 40 will have a different pixel count. Specifically, the pixel count will be much lower.

Figure 10B:
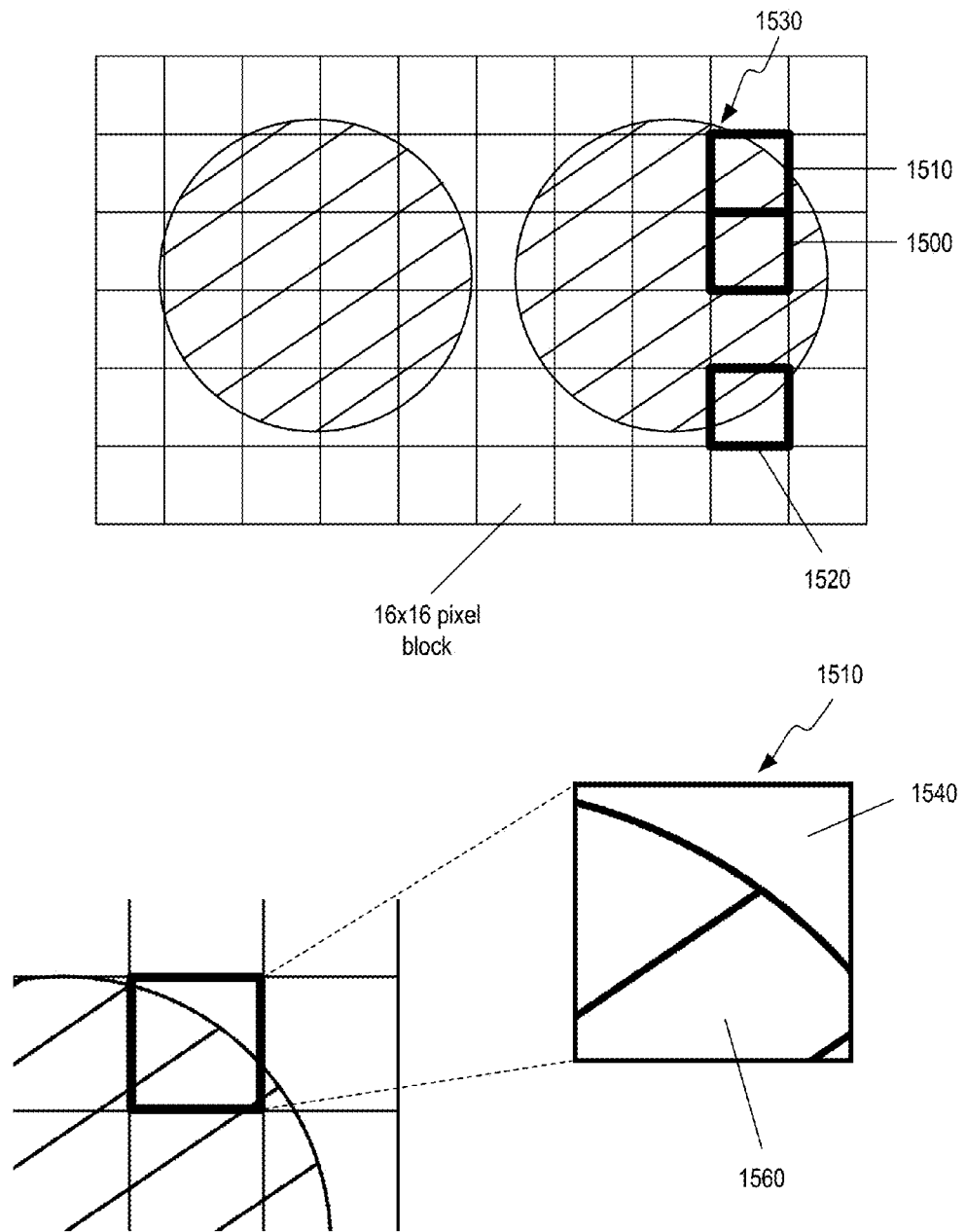

Other metrics are utilized for assigning pixel numbers to each region if the projection type comprises a projection lens type other than equirectangular. As an example, reference is made to FIG. 10B, which illustrates a fish eye projection type. Suppose for this example that a frame comprises 100 blocks, where each block is a (16×16) pixel block. However, in accordance with various embodiments, each block is not necessarily allocated 256 pixels. In the example shown, block 1500 in the image 1530 is allocated 256 pixels, whereas block 1510 has portion region in blank space and is therefore allocated only 200 pixels. Block 1520 has a smaller portion region in the image 1530 and is therefore allocated only 170 pixels. In this regard, the pixel number for each block is determined based on the area of image 1560 within the block (area of the block 1510–black area 1540=area of image 1560). As the system does not need to encode each block with 256 pixels, faster and more efficient encoding may be achieved.

The bit allocation performed by the computing device 102 based on pixel number is now described. With respect to the encoder rate control, the bit size of the entire frame is first determined. For example, suppose that the target bitrate is 3 Mbps and that the encoded frame bitrate is 2.5 Mbps. Within the H.264 framework, encoder parameters are adjusted to achieve the target bitrate, where rate control is defined in the H.264 standard. Regions that are prominently displayed will be allocated a bitrate that is higher than the average frame rate of 3 Mbps, whereas regions in the 360 video that are less prominently displayed are allocated a bitrate that is lower than the average frame rate of 3 Mbps.

To further illustrate, suppose that the entire frame has a total of 500 bits and that the entire frame comprises 100 blocks. Based on these values, conventional systems will allocate 5 bits for each block for encoding the frame in accordance with the following equation:

$$\text{Number of bits to allocate} = 500 \times \frac{\text{block size}}{\text{width} \times \text{height}} = 500 * \text{block number} \quad (1)$$

In accordance with various embodiments, however, the weighting is based on the pixel number, as set forth in the equation below:

$$\text{Surface Area of Sphere} = 500 \times \frac{(360) \text{ region bit pixel number}}{(360) \text{ total pixel number}} \quad (2)$$

Specifically, equation 2 is utilized for calculating the number of bits to allocate for each block for encoding purposes in accordance with various embodiments. Thus, in accordance with various embodiments, rate control will decide the frame size. The weighting of bit allocation in the frame is changed.

The quantization parameter (QP) defines how much spatial detail is saved. A smaller QP corresponds to a higher bit rate, whereas a higher QP corresponds to a lower bit rate. A base QP (also known as frame QP) value is determined for the video frame, and the difference in QP value for each region with respect to the base QP is determined. The QP value ranges from 0 to 255 for 8 bits. The computing device 102 performs quantization, and the bitrate allocation is determined based on adjustment of the QP value to control the size between regions or frames. In accordance with exemplary embodiments, the encoder 118 in the computing device 102 will determine the difference in QP value (between the QP value of each region and the base QP). For example, if the difference in QP values for a given region is 3, then the computing device 102 separates the blocks by the region size into 7 groups: −3, −2, −1, 0, 1, 2, 3. Thus, regions that are more prominently displayed in the 360 video will be assigned a smaller QP value.

Figure 11:
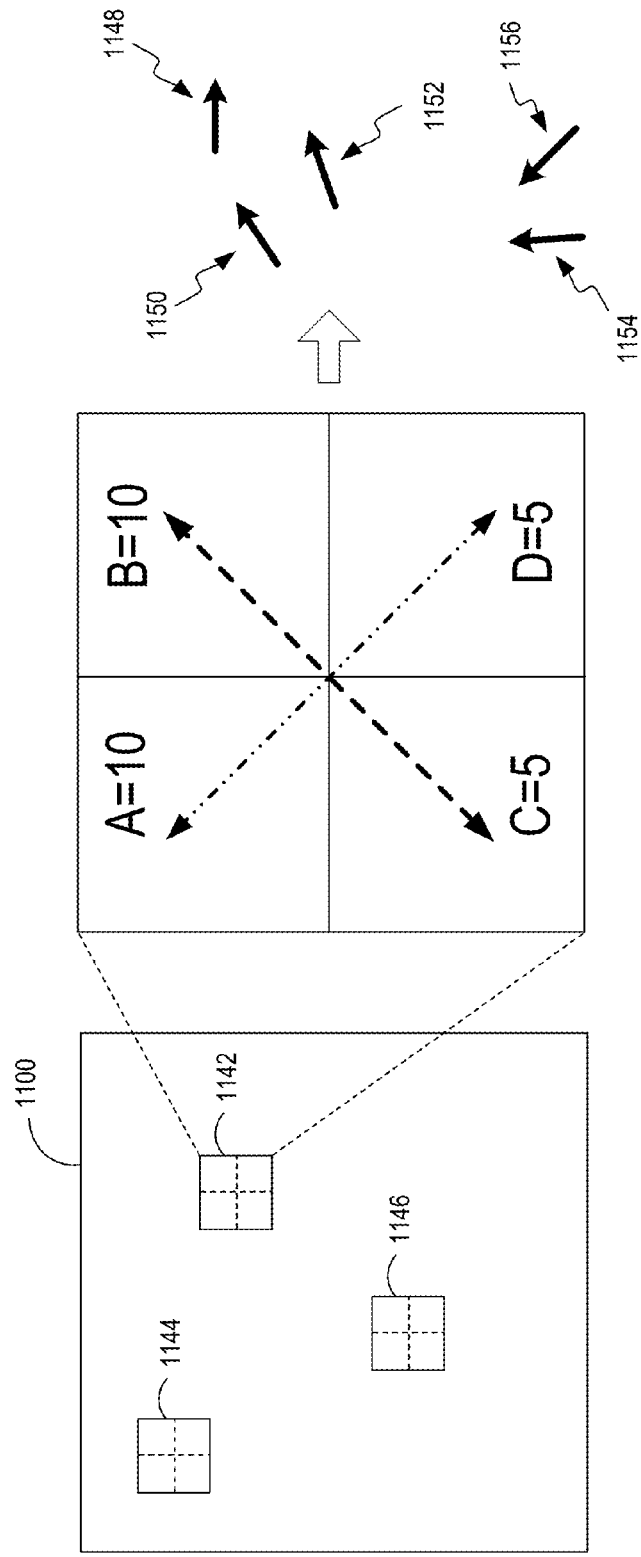
FIG. 11 illustrates one implementation for determining the edge and corresponding direction in accordance with various embodiments.

Reference is made to FIG. 11, which illustrates one implementation for determining the edge and corresponding direction. First, pixel blocks 1142, 1144, 1146 within a frame 1100 are located. Next, pairs of blocks are subtracted from each other, where the pairs of blocks may comprise, for example, blocks 1142 and 1146, blocks 1144 and 1146, or blocks 1144 and 1142. A positive value or a negative value will result from the subtraction operation, thereby signifying the change in direction. Next, different directions 1148, 1150, 1152 are derived, and edge information is then derived based on the different directions 1148, 1150, 1152. Based on the change in direction, a corresponding distortion value is assigned. Use of an edge detection technique allows the system to obtain the edge direction and the edge strength. The difference of the edge detection results is then compared for spherical mode and panoramic mode. The distortion value is computed based on the changes in the edge direction and edge strength, and bit allocation may then be updated based on the computed distortion values.

In some embodiments, each of the pixel blocks 1142, 1144, and 1146 is first segmented into a plurality of sub-blocks (e.g., 4 sub-blocks), which are each assigned corresponding pixel values—for example, (10, 10, 5, 5) or (10, 3, 2, 3), where pixel value A=10, pixel value B=3, pixel value C=2, and pixel value D=3. For some embodiments, the pixel values are assigned based on the gray value of the pixel. The direction can then be determined based on a gradient value derived, for example, by calculating the difference between pairs of pixel values (e.g., (pixel value A=10)−(pixel value D=5)). Specifically, the two sets of diagonal differences are calculated for computing the gradient direction, as shown by the two arrows in FIG. 11. That is, a first diagonal difference comprises the difference between pixel value A and pixel value D while a second diagonal difference comprises the difference between pixel value B and pixel value C. For example, gradients are determined by determining the difference of pixel values 10, 10, 5 and 5 to derive direction 1154 shown in FIG. 11. As another example, gradients are determined based on difference of pixel values (10, 3, 2 and 3) based on the following difference values: (e.g., (pixel value A=10)−(pixel value D=3); (pixel value B=3)−(pixel value C=2)) to derive a direction 1156. For some embodiments, the direction 1156 is derived based on a dot product between the difference values, where each difference value represents a vector. Specifically, the product of the Euclidean magnitudes of the two vectors is determined, and the cosine of the angle between the vectors is then calculated. A gradient is determined to be close to an edge when neighboring gradients reflect a large change in direction.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method implemented in a computing device for re-encoding 360 video based on adjusted bitrate allocation, comprising:
 receiving and decoding a 360 video;
 partitioning the 360 video into a plurality of regions;
 determining a pixel number for each of the plurality of regions;
 determining a distortion level for each of the plurality of regions, wherein the distortion level is determined based on a projection lens type corresponding to the 360 video, and wherein determining the distortion level for each of the plurality of regions comprises:
  for each of the plurality of regions,
   superimposing a square onto a region;
   measuring a degree of warping associated with superimposing the square onto the region; and
   assigning a distortion value based on the degree of warping, wherein a higher distortion value is assigned for regions with a higher degree of warping relative to regions with a lower degree of warping; and
 performing, by the computing device, bitrate allocation for each of the regions based on one or more of: the corresponding pixel number and the corresponding distortion level.

2. A method implemented in a computing device for re-encoding 360 video based on adjusted bitrate allocation, comprising:
 receiving and decoding a 360 video;
 partitioning the 360 video into a plurality of regions;
 determining a pixel number for each of the plurality of regions, wherein the pixel number for each of the plurality of regions is determined based on a projection lens type corresponding to the 360 video;
 determining a distortion level for each of the plurality of regions; and
 performing, by the computing device, bitrate allocation for each of the regions based on one or more of: the corresponding pixel number and the corresponding distortion level.

3. The method of claim 2, wherein responsive to determining that the projection lens type is equirectangular, regions towards a viewing boundary of a panoramic view are allocated fewer bits relative to regions that fall within a central region of the panoramic view.

4. The method of claim 1, wherein bitrate allocation is further based on estimated motion of each of the plurality of regions.

5. The method of claim 4, further comprising performing motion estimation based on a projected spherical view to identify neighboring regions.

6. A system, comprising:
 a memory storing instructions; and
 a processor coupled to the memory and configured by the instructions to at least:
  receive and decoding a 360 video;
  partition the 360 video into a plurality of regions;
  determine a pixel number for each of the plurality of regions;
  determine a distortion level for each of the plurality of regions, wherein the distortion level is determined based on a projection lens type corresponding to the 360 video, and wherein determining the distortion level for each of the plurality of regions comprises:
   for each of the plurality of regions,
    superimposing a square onto a region;
    measuring a degree of warping associated with superimposing the square onto the region; and
    assigning a distortion value based on the degree of warping, wherein a higher distortion value is assigned for regions with a higher degree of warping relative to regions with a lower degree of warping; and
  perform bitrate allocation for each of the regions based on one or more of: the corresponding pixel number and the corresponding distortion level.

7. A system, comprising:
 a memory storing instructions; and
 a processor coupled to the memory and configured by the instructions to at least:
  receive and decoding a 360 video;
  partition the 360 video into a plurality of regions;
  determine a pixel number for each of the plurality of regions, wherein the pixel number for each of the plurality of regions is determined based on a projection lens type corresponding to the 360 video;
  determine a distortion level for each of the plurality of regions; and
  perform bitrate allocation for each of the regions based on one or more of: the corresponding pixel number and the corresponding distortion level.

8. The system of claim 7, wherein responsive to determining that the projection lens type is equirectangular, regions towards a viewing boundary of a panoramic view are allocated fewer bits relative to regions that fall within a central region of the panoramic view.

9. The system of claim 6, wherein bitrate allocation is further based on estimated motion of each of the plurality of regions.

10. The system of claim 9, further comprising performing motion estimation based on a projected spherical view to identify neighboring regions.

11. A non-transitory computer-readable storage medium storing instructions to be implemented by a computing device having a processor, wherein the instructions, when executed by the processor, cause the computing device to at least:
 receive and decoding a 360 video;
 partition the 360 video into a plurality of regions;
 determine a pixel number for each of the plurality of regions;
 determine a distortion level for each of the plurality of regions, wherein the distortion level is determined based on a projection lens type corresponding to the 360 video, and wherein determining the distortion level for each of the plurality of regions comprises:
  for each of the plurality of regions,
   superimposing a square onto a region;
   measuring a degree of warping associated with superimposing the square onto the region; and
   assigning a distortion value based on the degree of warping, wherein a higher distortion value is assigned for regions with a higher degree of warping relative to regions with a lower degree of warping; and perform bitrate allocation for each of the regions based on one or more of: the corresponding pixel number and the corresponding distortion level.

12. A non-transitory computer-readable storage medium storing instructions to be implemented by a computing device having a processor, wherein the instructions, when executed by the processor, cause the computing device to at least:
  receive and decoding a 360 video;
  partition the 360 video into a plurality of regions;
  determine a pixel number for each of the plurality of regions, wherein the pixel number for each of the plurality of regions is determined based on a projection lens type corresponding to the 360 video;
  determine a distortion level for each of the plurality of regions; and
  perform bitrate allocation for each of the regions based on one or more of: the corresponding pixel number and the corresponding distortion level.

13. The non-transitory computer-readable storage medium of claim 12, wherein responsive to determining that the projection lens type is equirectangular, regions towards a viewing boundary of a panoramic view are allocated fewer bits relative to regions that fall within a central region of the panoramic view.

14. The non-transitory computer-readable storage medium of claim 11, bitrate allocation is further based on estimated motion of each of the plurality of regions.

* * * * *